T. N. CASS.
CUTTER CASING.
APPLICATION FILED FEB. 11, 1910.
1,046,551.
Patented Dec. 10, 1912.
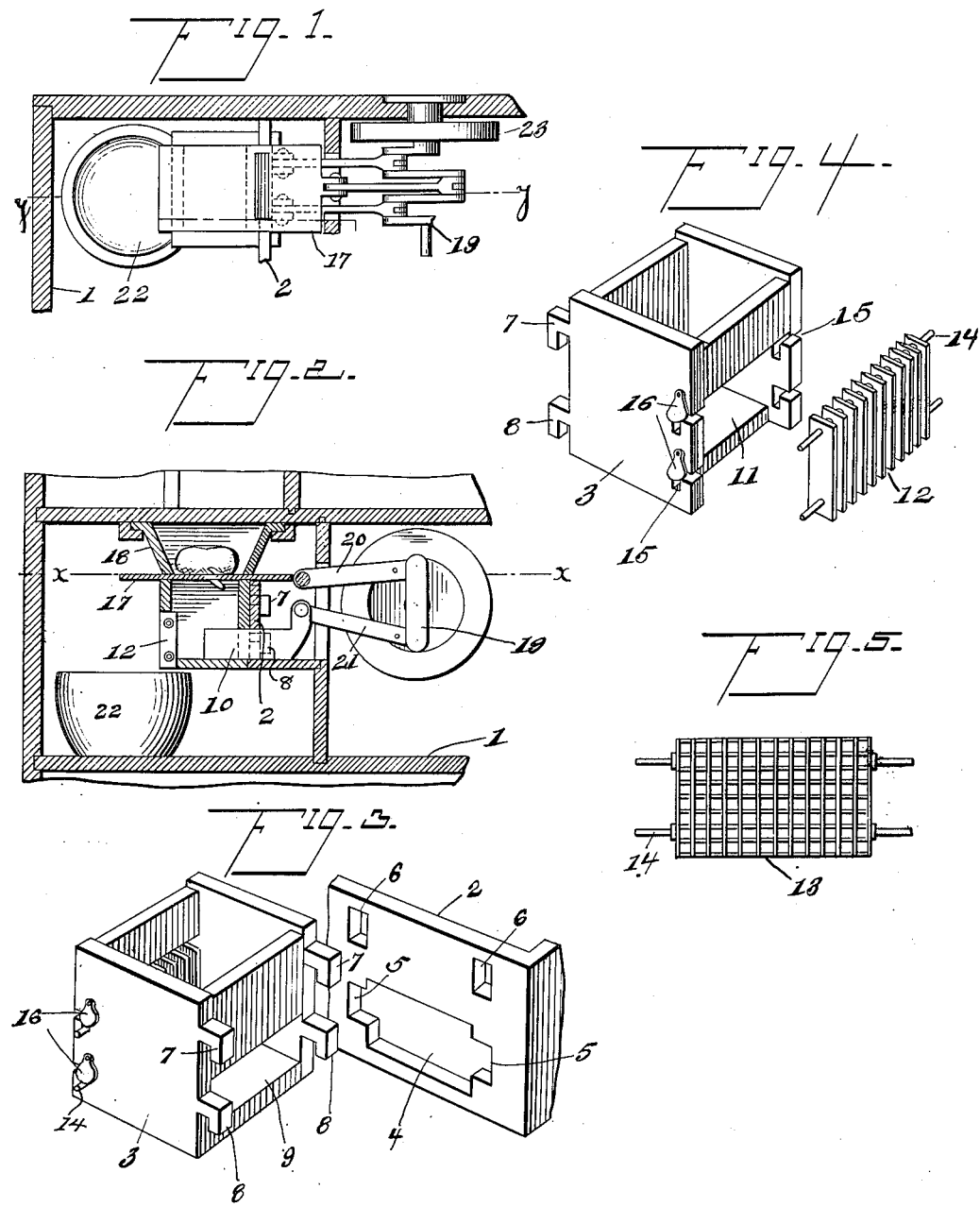
Inventor
Thomas N. Cass.
Witnesses
Charles R. Beall.
U. B. Hillyard.
By Victor J. Evans
Attorney

UNITED STATES PATENT OFFICE.

THOMAS N. CASS, OF SEMINOLE, TEXAS.

CUTTER-CASING.

1,046,551.

Specification of Letters Patent.   Patented Dec. 10, 1912.

Application filed February 11, 1910.   Serial No. 543,316.

*To all whom it may concern:*

Be it known that I, THOMAS N. CASS, a citizen of the United States, residing at Seminole, in the county of Gaines and State of Texas, have invented new and useful Improvements in Cutter-Casings, of which the following is a specification.

This invention has relation to cutting mechanism for vegetables and fruit, whereby the same may be cut into various shapes and sizes when preparing them for the table or to be cooked.

The invention relates most especially to the means whereby a receptacle may be detachably connected with a support and with which operates cutting mechanism, the parts being combined and arranged in a novel manner as more fully set forth hereinafter, finally claimed and illustrated in the drawings hereto attached, in which, Figure 1 is a horizontal section of a cutter casing embodying the invention, on the line $x—x$ of Fig. 2. Fig. 2 is a vertical section on the line $y—y$ of Fig. 1 having the vessel arranged to receive the cuttings in full lines. Fig. 3 is a detail perspective view of the support and receptacle, the parts being separated. Fig. 4 is a detail perspective view of the receptacle and a gang cutter, the latter being disconnected from the receptacle. Fig. 5 is a front view of a different form of gang cutter.

Corresponding and like parts are referred to in the following description, and indicated in all the views of the drawings, by the same reference characters.

The numeral 1 designates part of a cabinet or casing to which the cutter mechanism embodying the invention is fitted.

The numeral 2 designates a cross piece forming a support to which a receptacle 3 is detachably connected. The support 2 has a horizontally elongated opening 4 and smaller openings 5 leading from the ends of the opening 4. Other openings 6 are formed in the support 2 in vertical line with the openings 5. The receptacle 3 has two sets of hooks 7 and 8 which are adapted to pass through the respective openings 6 and 5 and engage with the support 2 and hold the receptacle 3 in place thereon. The side of the receptacle 3 having the hooks 7 and 8 is also formed with an opening 9 which registers with the opening 4 and through which openings 4 and 9 a plunger 10 is arranged to operate. The hooks 7 and 8 are so positioned as to pass through openings 6 and 5 and to engage the support 2, as indicated most clearly in Fig. 2. The front of the receptacle 3 has an opening 11 opposite the opening 9 and to this opening is fitted a gang cutter, which may consist of a plurality of spaced blades, as indicated at 12 in Fig. 4, or a plurality of crossing blades, as indicated at 13 in Fig. 5. Pins 14 project from the ends of the gang cutters and are adapted to enter L slots 15 formed in the edges of the sides of the receptacle 3 in line with the opening 11. Catches 16 pivoted to the sides of the receptacle extend across the upper ends of the vertical portions of the L slots to hold the pins 14 therein when the gang cutter is in position.

A cutter 17 is arranged to operate over the receptacle 3. A hopper 18 is located above the cutter 17 in line with the receptacle 3 and receives the fruit, vegetable or other article to be cut. A crank shaft 19 is mounted upon the casing or part forming a support for the cutter mechanism and pitmen 20 and 21 connect crank portions of the crank shaft with respectively the cutter 17 and plunger 10, the parts being arranged in such a manner that when the cutter 17 is advanced the plunger 10 is retracted and vice versa. The cuttings resulting from the operation of the cutter 17 drop into the receptacle 3 and are forced from said receptacle by means of the plunger 10 across the path of the gang cutter, said cuttings finally dropping into a vessel 22 arranged to receive them. The crank shaft 19 may be operated in any manner and is provided with a fly wheel 23 for steadying the rotation thereof.

From the foregoing, taken in connection with the accompanying drawing, it will be understood that the invention provides a cutter mechanism which may be fitted to any kitchen cabinet, or other style of casing, and which in operation will admit of cutting fruit or vegetables into different forms or sizes by substituting one style of gang cutter for another, the receptacle being detachable to admit of cleaning or for other desired purpose.

Having thus described the invention, what is claimed as new, is:—

In combination a support having an opening and having smaller openings leading from the ends of the first mentioned opening, a receptacle having an opening in a side to register with the opening of the support, hooks upon the receptacle at the sides of the opening thereof to pass through the small openings of the support and engage therewith, a cutting mechanism mounted upon the receptacle, a plunger adapted to operate through the openings of the support and receptacle, and operating mechanism having connection with the support for actuating both the cutting mechanism and the plunger.

In testimony whereof I affix my signature in presence of two witnesses.

THOMAS N. CASS.

Witnesses:
BENNETT S. JONES,
J. R. WOODWORTH.